US012545044B2

(12) United States Patent
Ganz

(10) Patent No.: US 12,545,044 B2
(45) Date of Patent: Feb. 10, 2026

(54) METHOD OF APPLYING A GRAPHIC TO A PRODUCT FORMED FROM INDIVIDUAL WOODEN STICKS

(71) Applicant: Michael Weinig AG, Tauberbischofsheim (DE)

(72) Inventor: Jochen Ganz, Tauberbischofsheim (DE)

(73) Assignee: Michael Weinig AG, Tauberbischofsheim (DE)

( * ) Notice: Subject to any disclaimer, the term of this patent is extended or adjusted under 35 U.S.C. 154(b) by 0 days.

(21) Appl. No.: 18/660,771

(22) Filed: May 10, 2024

(65) Prior Publication Data

US 2024/0375420 A1 Nov. 14, 2024

(30) Foreign Application Priority Data

May 12, 2023 (DE) ..................... 10 2023 001 998.4

(51) Int. Cl.
*B41M 5/00* (2006.01)
*B41M 3/00* (2006.01)

(52) U.S. Cl.
CPC .......... *B41M 3/008* (2013.01); *B41M 5/0011* (2013.01); *B41M 5/0076* (2013.01)

(58) Field of Classification Search
CPC ...... B41M 1/38; B41M 3/008; B41M 5/0011; B41M 5/0047; B41M 5/0076
See application file for complete search history.

(56) References Cited

U.S. PATENT DOCUMENTS 4,169,005 A * 9/1979 Fogle ...................... B32B 21/14 156/320
5,869,138 A * 2/1999 Nishibori ................ B44C 1/222 427/256
2004/0028830 A1 2/2004 Bauer et al.
2005/0144898 A1 7/2005 Sjoberg
2023/0029940 A1 * 2/2023 Shapiro ..................... G06T 7/13
2023/0077381 A1 3/2023 Frings et al.

FOREIGN PATENT DOCUMENTS

AT 511152 A1 9/2012
EP 1541373 A2 6/2005
EP 2596959 B1 5/2013
EP 3470972 A1 * 4/2019 .......... B41M 5/0041
WO 0200449 A1 1/2002

* cited by examiner

*Primary Examiner* — Christopher E Mahoney
*Assistant Examiner* — Marissa Ferguson-Samreth
(74) *Attorney, Agent, or Firm* — Smartpat PLC

(57) ABSTRACT

A method is used to apply a graphic to a product formed at least partially from individual wooden sticks. The graphic is produced by a printing method. To ensure that printed products can be produced easily and cost-effectively, the graphic is divided into graphic sections that are printed onto the wooden sticks. These are put together after the printing process, with the graphic sections of the individual wooden sticks creating the graphic on the product.

19 Claims, 7 Drawing Sheets

Fig. 1
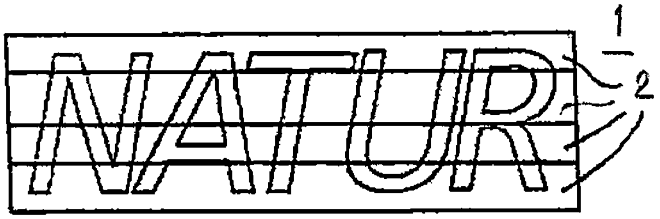
Fig. 2
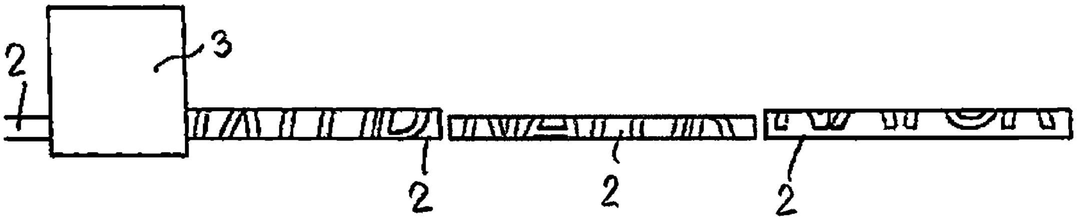
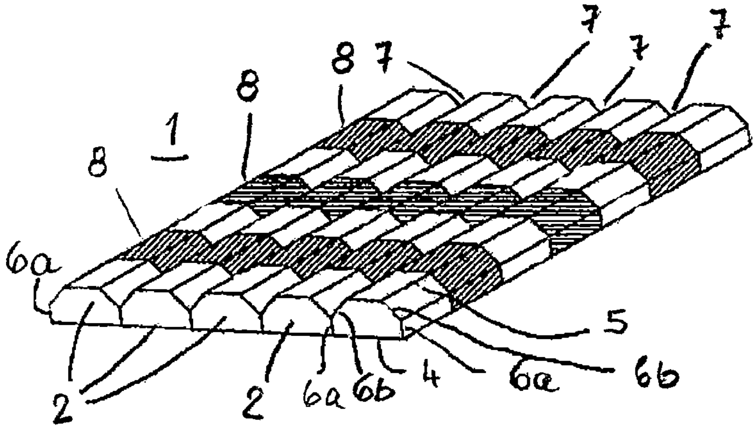
Fig. 3

METHOD OF APPLYING A GRAPHIC TO A PRODUCT FORMED FROM INDIVIDUAL WOODEN STICKS

CROSS-REFERENCE TO RELATED APPLICATION

This application claims the benefit of German Patent Application DE 10 2023 001 998.4, filed on May 12, 2023, the content of which is incorporated by reference in its entirety.

TECHNICAL FIELD

The disclosure relates to a method for applying a graphic to a product formed at least partially from individual wooden sticks.

BACKGROUND

To apply a graphic to wooden sticks of a product, the graphic is traditionally printed on a wrapping material, which is then used to wrap the wooden sticks. A protective layer, such as a clear varnish, is then applied to the wrapping material to protect the graphic from external influences.

Different machines are required for the printing process, the wrapping, and the application of the protective layer, which not only makes the production of such printed products considerably expensive but is also very complex.

SUMMARY

The present disclosure provides an improved method for producing printed products in a simple and cost-effective manner. In the method, the graphic is applied directly to wooden sticks that are part of the product. The graphics to be applied to the product are first divided into individual graphic sections. The division is carried out in such a way that the individual graphic sections are printed directly on the corresponding wooden sticks. The graphic sections on the wooden sticks together form the graphic within the final product. After the printing process, the printed wooden sticks are assembled according to the specifications/planning so that the graphic sections on the final product create the graphic. This method is very cost-effective because a wrapping material and corresponding machines for wrapping the wooden sticks are not required. In addition, the graphic can be applied in a short amount of time.

In the simplest case, the final product consists only of the wooden sticks. However, it is also possible that the final product contains other parts besides the wooden sticks, for example parts made of plastic. The graphic sections that form the graphic are simply printed directly onto the wooden sticks, which are arranged within the final product in such a way that the graphic sections printed on the wooden sticks form the desired overall graphic on the final product.

The wooden sticks can have different widths and/or thicknesses and/or lengths. The graphic sections are printed directly on the wooden sticks, regardless of their dimensions. With differently dimensioned wooden sticks, differently designed products can be created, which are provided with a graphic.

It is advantageous if the wooden sticks have a constant cross section over their length. This simplifies the printing of the graphic sections.

A preferred procedure is to prime and/or varnish the side of the wooden sticks to be printed on before printing. This is particularly the case if the wooden sticks have an inhomogeneous surface. Pre-processing the wooden sticks on the side to be printed ensures that the printing ink can be reliably applied to the wooden sticks. The material used for priming or painting is designed in such a way that the printing ink adheres securely to the primer or paint.

It is also possible to plane and/or sand the wooden sticks smooth on the side to be printed on before the printing process. In this case, too, a surface on which the printing ink adheres securely is created on the side of the wooden sticks to be printed.

The graphic to be applied to the final product is captured in file form and saved as a file. It can then be processed on a computer using appropriate programs.

In particular, the graphic file is divided into individual files using an appropriate graphics program. The individual files are advantageously created and saved in RIP (Raster Imaging Processor) format. The division into the individual files is carried out in such a way that each individual file is assigned to one of the wooden sticks on which the graphic section corresponding to the individual file is to be printed. Each wooden stick to be printed is assigned an individual file, each of which contains a part of the overall graphic.

For the printing process, the individual files are advantageously fed to a printing machine, which prints the corresponding graphic section directly onto the respective wooden stick according to the individual file.

In a simple embodiment, the wooden sticks are fed to the printing machine in a predetermined sequence. Accordingly, the individual files assigned to the wooden sticks are also stored in the printing machine in a predetermined sequence or are fed to it in a predetermined sequence.

So that the wooden sticks can also be printed independently of a predetermined sequence, it is advantageous if the wooden sticks are provided with a marking. This marking can, for example, be an RFID chip or a QR code that is attached to the respective wooden stick.

In a further embodiment, the grain on the end face of the wooden sticks is detected by at least one detection device in order to identify them as a detection feature. With this identification, the wooden sticks can be tracked during their transport through the system. This allows the processing and the processing sequence in the system/printing machine to be controlled. In particular, it can be detected when wooden sticks had to be rejected because they were broken or rejected, for example. Spare parts can then be supplied, which in turn can be detected and tracked via their end face grain, whereby their processing can also be controlled easily and reliably.

The end face grain of the wooden sticks differs sufficiently from one another that it is possible to reliably determine which wooden stick it is by capturing and analyzing the wood grain. Accordingly, the wooden stick fed to the printing machine is printed with the corresponding graphic section, which can be generated using the corresponding individual file. This procedure is very cost-effective and simple. The wooden sticks do not have to be fed to the printing machine in a specific sequence. Rather, the marking is used to determine which wooden stick it is. Then, according to the identified wooden stick, the corresponding individual file is loaded into the printing machine or provided by the printing machine, which prints the corresponding graphic section on the wooden stick according to this individual file.

Software can be used to check, for example, whether the order of the wooden sticks to be printed is correct, whether the order of the wooden sticks is different, whether a wooden stick is missing or, for example, whether there is one stick too many. This method leads to a high level of production reliability. Since the grain on the end face of the wooden sticks is used as a marking, no additional marking elements, such as RFID chips or a QR code, are required, which would also have to be attached to the wooden stick. The end face grain of the wooden sticks virtually forms a fingerprint of the wooden stick, which can thus be reliably detected and tracked on the basis of its end face grain.

In an advantageous embodiment, a sensor system or a camera system is used as the detection device.

The invention is explained in more detail with reference to exemplary embodiments illustrated in the drawings.

BRIEF DESCRIPTION OF THE DRAWINGS

FIG. 1 is a schematic representation of a product consisting of a plurality of wooden sticks placed together, which are printed and have different widths.

FIG. 2 is a schematic representation of the process of printing the wooden sticks according to FIG. 1.

FIG. 3 is a schematic representation of a final product composed of profile sticks with printing.

DETAILED DESCRIPTION

Figure 4:
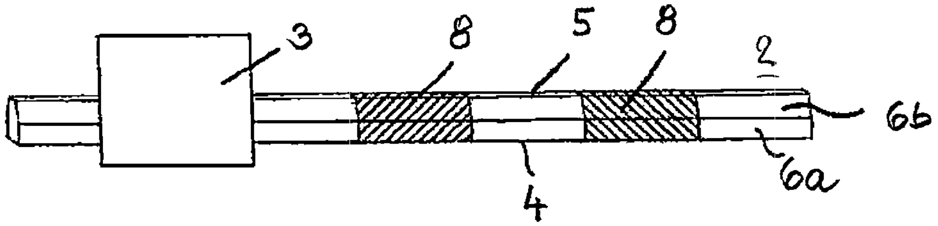
FIG. 4 is a schematic representation of the printing of the profile sticks according to FIG. 3.

With the method described below, it is possible to provide products composed of wooden sticks or having wooden sticks with a graphic in the form of, for example, a sketch, a photo and the like, wherein not the product itself, but the individual wooden sticks are printed before the final product is assembled. The printing of the wooden sticks is advantageously done by a digital printing machine, which is known per se and will therefore not be explained in more detail. The printing machine is designed to print the wooden sticks in the required manner as they are transported past one or more printing heads of the printing machine.

The wooden sticks can be made of solid wood or wood-based materials, for example MDF.

It is also possible that the printing machine is designed in such a way that the print head(s) is (are) moved past the wooden stick.

The wooden sticks are printed one after the other in such a way that the final product has the desired graphic after the wooden sticks have been assembled or arranged.

FIG. 1 shows an example of a first embodiment in which the product 1 has the letters “NATUR” as a graphic. The product 1 consists, by way of example, of four wooden sticks 2 which rest against one another with their longitudinal sides and which, by way of example, have the same length but different widths.

Each wooden stick 2 contains a part of the “NATUR” graphic. If, as shown in FIG. 1, the wooden sticks 2 are placed against one another with their longitudinal sides, this creates the continuous graphic, which is composed of the partial graphics located on the wooden sticks 2.

In the exemplary embodiment, the wooden sticks are of equal length and have a rectangular outline. In addition, the wooden sticks 2 have a rectangular cross section, for example.

Alternatively to the exemplary embodiment shown, the wooden sticks 2 may also have the same width.

FIG. 2 shows, by way of example, a printing machine 3, in particular a digital printing machine, with which the individual wooden sticks 2 are successively printed on their upper side. It is shown by way of example that the three lower wooden sticks 2 in FIG. 1 are already printed with a part of the “NATUR” graphic. The fourth wooden stick 2 is currently being printed by the printing machine 3 and forms the upper wooden stick in the final product 1 according to FIG. 1.

All wooden sticks 2 are printed on their upper side, which forms the visible side of the final product 1 on which the graphic “NATUR” is located.

FIG. 3 shows the possibility of printing not only rectangular, but also polygonal wooden sticks 2. The wooden sticks 2 have the same length, the same width, and the same cross section.

As in the previous embodiment, the wooden sticks 2 in the product 1 rest against one another with their longitudinal sides and can be firmly connected to one another, in particular adhesively bonded. The wooden sticks 2 of the previous embodiment can also be firmly connected to one another, preferably adhesively bonded.

The wooden sticks 2 according to FIG. 3 have a flat bottom side 4 and a top side 5 parallel thereto. The bottom side 4 and the top side 5 each have a rectangular outline, with the top side 5 being narrower than the bottom side 4.

Vertically adjoining the longitudinal edges of the bottom side 4 are side wall sections 6*a*, to which in turn further side wall sections 6*b* adjoin at an obtuse angle, which connect the side wall sections 6*a* to the top side 5.

The wooden sticks 2 have the same cross-section throughout, as in the previous embodiment. They lie against each other with the side wall sections 6*a*. The further side wall sections 6*b* form continuous V-shaped depressions 7 over the length of the product 1 formed from the wooden sticks 2.

In this embodiment, three graphics 8 are provided on the visible side of the product 1, which are spaced apart from one another and extend over the entire width of the product 1, i.e., over the top side 5 and the further side wall sections 6b. In the exemplary embodiment, at least the two edge-side wooden sticks 2 of the product 1 are also printed on a side wall section 6a. The graphics 8 are shown only schematically in FIG. 3. By way of example, the graphics 8 are arranged next to one another at a distance in the longitudinal direction of the individual wooden sticks 2. The visible side of the product 1 can also be designed in such a way that there is only a single graphic 8 on the visible side, which can have different widths.

As shown in FIGS. 3 and 4, the wooden sticks 2 or a part of the wooden sticks 2 are printed by the printing machine 3 in such a way that the graphic 8 extends from the further side wall section 6b to the opposite further side wall section 6b. In the case of the two edge-side wooden sticks 2, the graphic 8 extends at least over the side wall sections 6a located on the outside in the final product 1.

In the case of the wooden sticks 2 which lie against one another with their side wall sections 6a, printing on these side wall sections 6a is not provided, although, in principle, these side wall sections 6a could also be printed.

If the wooden sticks 2 are placed against one another to form the product 1 (FIG. 3), the product 1 has the respective graphic 8 on its visible side, which extends continuously from the side wall section 6a of the left wooden stick 2 in FIG. 3 to the side wall section 6a of the right wooden stick 2.

The further side wall sections 6b, which delimit the recesses 7 on the visible side of the product 1, are printed so that the graphic 8 also extends continuously in the area of the recesses 7.

According to the previous exemplary embodiment, the wooden sticks 2 are fed in succession to the printing machine 3, with which a part of the graphic 8 of the final product 1 is printed onto the wooden sticks in each case. As soon as the wooden sticks 2 rest against one another to form the final product 1, the desired overall graphic is created on the visible side of the product 1.

The graphics on the visible side of the product 1 can be black and white or colored. With the printing machine 3, the desired color(s) can be achieved easily.

Figure 5:
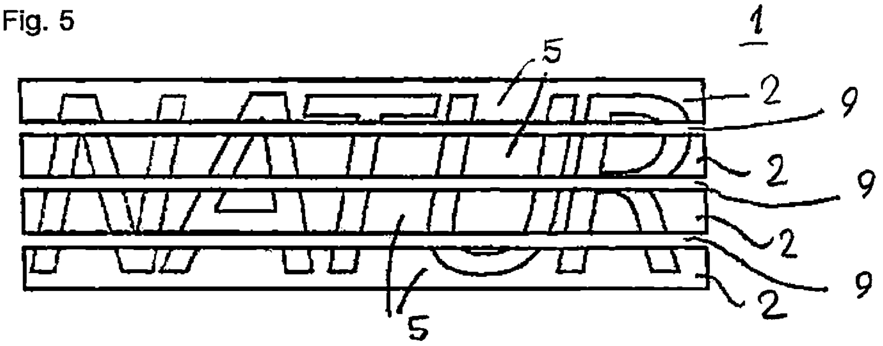
FIG. 5 is a schematic representation of a final product formed from printed wooden sticks spaced apart from one another.

FIG. 5 shows, by way of example, the possibility of joining the wooden sticks 2 together to form the product 1 in such a way that gaps 9 are formed between the wooden sticks 2. The graphic "NATUR" on the visible side of the product 1 thus has interruptions resulting from the gaps 9 between the wooden sticks 2. The width 25 of the gaps 9 is advantageously chosen so that the graphic "NATUR" is still clearly visible on the visible side of the final product 1.

In this case, too, it is sufficient if the partial graphics are applied only to the top side 5 of the wooden sticks 2, which, according to the embodiment according to FIG. 1, have a constant rectangular cross section over their length. In contrast to the exemplary embodiment according to FIG. 1, the wooden sticks 2 have the same width.

In principle, it is possible for the wooden sticks 2 to have different widths in accordance with the embodiment according to FIG. 1.

The wooden sticks 2 are again the same length and the same thickness. However, they can also be of different lengths and different thicknesses. This also applies to the previous embodiments.

Likewise, the final product 1 can be composed of wooden sticks with any profile shape.

The individual wooden sticks 2 are printed in succession by the printing machine 3 in the manner described.

Figure 6:
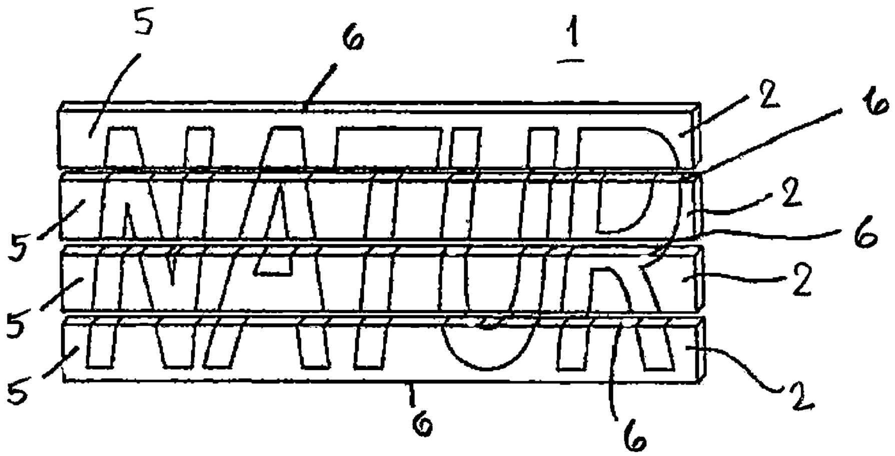
FIG. 6 is a schematic representation of a final product formed from wooden sticks, in which the wooden sticks are spaced apart from one another and are printed on the top and on at least one side surface.

FIG. 6 shows an exemplary embodiment in which the wooden sticks 2—similar to the exemplary embodiment according to FIG. 3—are printed on the top side 5 and on the side walls 6.

Depending on the design of the graphic, it is possible for the two wooden sticks, which form the upper and the lower edge of the final product 1, not to be printed on their longitudinal side forming the outer side of the product 1. This is the case if, as in the exemplary embodiment shown, the graphic does not extend over the entire width of the product 1, but is at a distance from the longitudinal sides 6 of the end wooden sticks 2.

FIG. 6 shows by way of example that the wooden sticks 2 are each printed with a graphic section on their mutually facing longitudinal sides. The graphic sections on the side walls 6 provide a three-dimensional visual impression.

Figure 7:
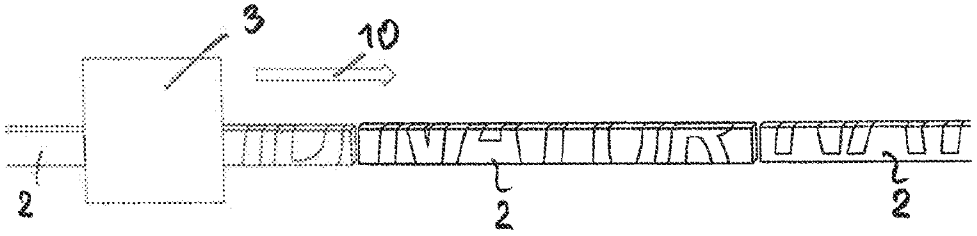
FIG. 7 is a schematic representation of the printing process when printing the wooden sticks according to FIG. 6.

As shown in FIG. 7, the individual wooden sticks 2 are successively printed with the corresponding part of the final "NATUR" graphic. For this purpose, the wooden sticks 2 are fed in succession in the transport direction 10 of the printing machine 3 in accordance with the previous embodiments and printed on the top side and on one or both side walls, depending on the print specification and print file.

Figure 8:
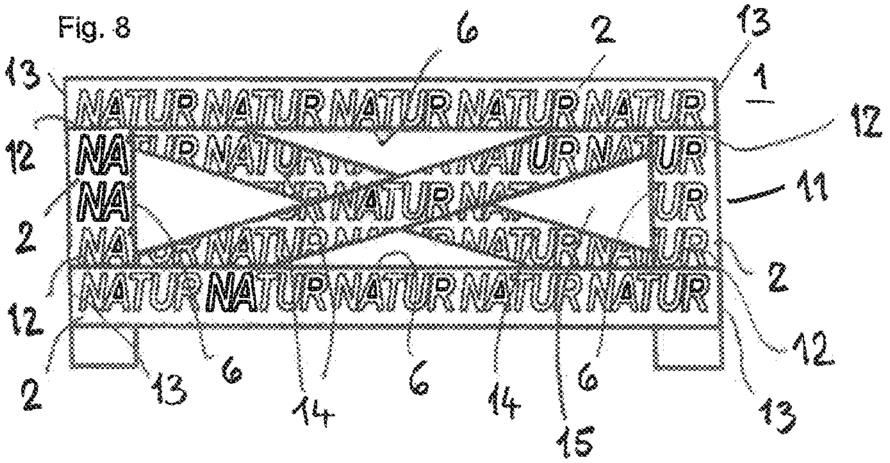
FIG. 8 is a schematic representation of a further embodiment of a product formed from a plurality of printed wooden sticks.

FIG. 8 shows an example of a product 1 in which a wooden construction is produced with the wooden sticks 2 as the final product 1. By way of example, it is shown that the final product 1 has a rectangular frame 11, which is formed by four wooden sticks 2 placed at right angles to one another. The longer wooden sticks 2 form the longitudinal sides of the frame 11, while the shorter wooden sticks 2 form the narrow sides of the frame 11. The short wooden sticks 2 lie flat with their end faces 12 against the mutually facing longitudinal sides 6 of the long wooden sticks 2.

Within the frame 11, diagonally extending further wooden sticks 14 are provided, which are connected with their end faces in the corner region of the frame 11 to the inner edge thereof.

One wooden stick 14 extends diagonally within the frame opening 15. Halfway along this wooden stick 14, two short wooden sticks 14 are connected on both sides, which are connected with their opposite end faces to the other two corner areas of the frame 11.

It is also possible that the final product 1 has two wooden sticks 14 lying one behind the other with respect to the plane of the drawing, which cross one another in the view according to FIG. 8. These diagonally extending wooden sticks 14 may have a thickness that is, for example, half the thickness of the wooden sticks 2 forming the frame.

Figure 9:
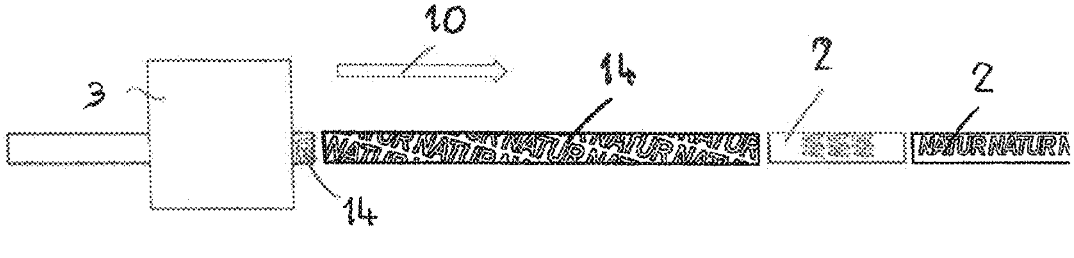
FIG. 9 is a schematic representation of the process of printing the wooden sticks according to FIG. 8.

All wooden sticks 2, 14 are provided on their top side with a part of the complete graphic which the finished wooden construction shows on the product 1. The individual wooden sticks 2, 14 are printed in succession by the printing machine 3, to which the wooden sticks 2, 14 are fed in succession in the transport direction 10 (FIG. 9).

In the exemplary embodiment, the wooden sticks 2, 14 each have a rectangular cross section over their length. The wooden sticks 14 forming the cross struts are still cut to size after printing so that they can be fastened to the frame 11 within the frame opening 15 in the corner region.

Figure 10:
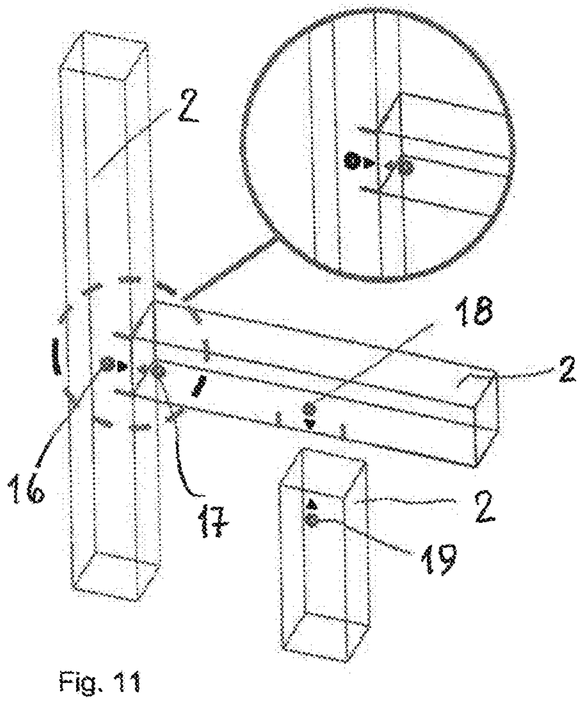
FIG. 10 is a schematic representation of the assembly of printed wooden sticks.
Figure 11:
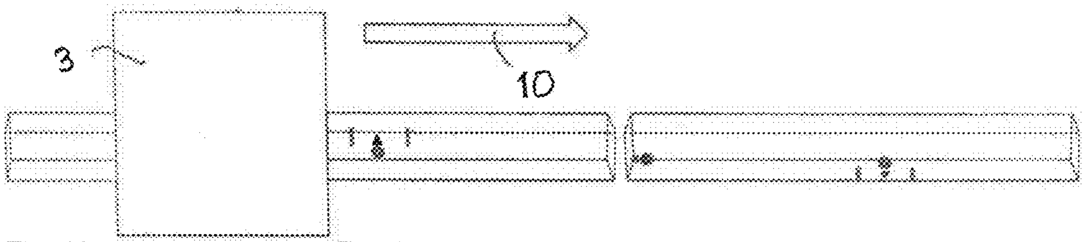
FIG. 11 is a schematic representation of the process of printing the wooden sticks according to FIG. 10.

FIGS. 10 and 11 show the possibility of applying markings 16 to 19 to wooden sticks by a printing process, with the aid of which a user can connect the individual wooden sticks to form a wooden structure in the correct manner. Such wooden sticks form parts of construction kits with which, for example, shelves can be assembled. As an example, a vertical wooden stick 2 is shown, to which a horizontal wooden stick 2 must be connected with its end face. In order for the user to find the exact and correct installation position, the two wooden sticks 2 are provided with the corresponding markings 16 and 17.

The horizontal wooden stick 2 has, for example, the further marking 18, with the help of which the user can correctly connect the vertical wooden stick 2 to the horizontal wooden stick 2 by means of its marking 19.

In addition to the position markings, the wooden sticks 2 may be printed with further information for assembly and processing, for example an identification of the individual wooden sticks, use and attachment of supplied fastening parts, such as screws, processing instructions, if the user has to make holes himself, for example, and the like.

The markings 16 to 19 and information can be applied in a simple manner with the aid of the printing machine 3 to the respective pieces of wood, which are fed in succession in the transport direction 10 of the printing machine 3.

The wooden sticks 2, 14 are printed directly by the printing machine 3.

Since the wooden sticks generally have an inhomogeneous surface (in the case of grown materials) or an open-pored surface (in the case of wood-based sticks, for example MDF), the wooden sticks are first primed, for example pre-treated with primer or filler and/or optionally painted in one color. After drying the wooden sticks 2, 14, a sanding process may have to be carried out. The wooden sticks 2, 14 are then pretreated in such a way that they can be printed directly with the graphic parts.

Finally, the wooden sticks 2, 14 are provided with a cover layer at least on their printed side in order to protect the printed graphic part from external influences. For this purpose, a clear varnish can be used, for example, which is applied to the printed side of the wooden sticks 2, 14.

Figure 12:
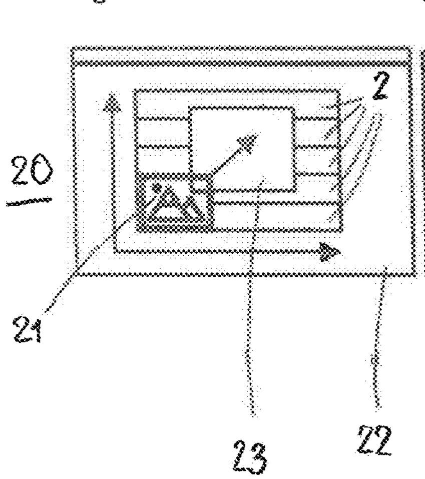
FIG. 12 is a schematic representation of a configurator that is used in the production of a product according to FIG. 1, in which the wooden sticks rest against one another.

In order to be able to print the wooden sticks 2, 14 easily and reliably, the desired graphic to be printed is imported into a software system. The wooden sticks 2, 14 to be printed are positioned relative to one another. The corresponding properties and parameters are defined by a configurator 20 (FIG. 12). The desired graphic 21 is imported into the software system. The external dimensions of the graphic 21 as well as the dimensions of the wooden sticks 2 are specified in the software system.

Advantageously, the method steps are displayed on a screen 22.

FIG. 12 shows, by way of example, the wooden sticks 2 with which the product 1 according to FIG. 1 is assembled and which are to be printed. The wooden sticks 2 are defined in the configurator 20 with regard to their dimensions such as length and width and are positioned on the screen with respect to one another as they are to be arranged in the subsequent final product 1.

A mask 23 is displayed on the screen 22, which indicates the position of the graphic 21 on the final product 1. The graphic 21 is placed or moved to the correct position in the mask 23 on the screen 22, which is illustrated by the arrow 12.

The software to be used can be located in the cloud, in a network or on a local computer or local computing system.

Using the software, the distribution of the graphic 21 to the individual wooden sticks 2 is calculated, in particular taking into account the dimensions of the final product 1 and the arrangement and dimensions of the individual wooden sticks 2.

Subsequently, the data is divided into individual part data according to the number of wooden sticks 2, which are assigned to the respective wooden stick 2. This creates printed images for each individual wooden stick 2. Advantageously, these individual data are converted into a RIP format, which is selected depending on the printing machine 3 used. The files also contain information about the color composition (black or colored), the print density, etc. In practice, four individual images for the printing colors cyan, magenta, yellow and black (CMYK) are derived from the print image with the corresponding pixel definitions (position, density). These RIP files are delivered to the printing machine 3, which then uses these files to print the respective part of the graphic 21 on the wooden sticks 2, 14.

The wooden sticks that have not yet been printed are fed to the printing machine 3 in a defined sequence.

Increased reliability when printing the individual wooden sticks 2, 14 with the correct graphic section is achieved if each wooden stick 2, 14 is given an identification feature, e.g. an RFID chip or a QR code. This identification feature is used to reliably identify which wooden stick 2, 14 is involved before the printing process. Then the corresponding RIP file is passed on to the printing machine 3, which prints the corresponding graphic section on the wooden stick according to the recognized wooden stick.

Figure 15:
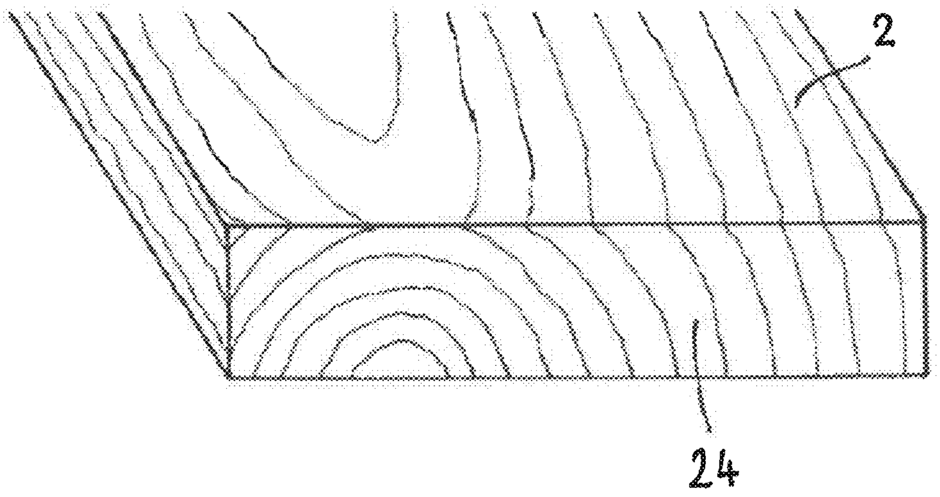
FIG. 15 shows a wood grain of the wooden sticks used to produce the product for capturing or scanning the optical fingerprint of the respective wooden stick.

An alternative and particularly advantageous embodiment is obtained if the grain on the end face of the respective wooden stick 2, 14 is detected as an identification feature of the wooden stick 2, 14. FIG. 15 shows, by way of example, the end face of a wooden stick 2 with an end grain 24. The end faces of the wooden sticks 2 have different end grains 24. To detect this end grain 24, sensors or camera systems can be used whose signals are stored so that an assignment of the wooden stick 2, 14 for the printing process is ensured at all times.

By a transport unit, the wooden sticks 2, 14 are transported through the printing machine 3 one after the other and at a defined speed. The RIP file belonging to the respective wooden stick 2, 14 to be printed is fed to the printing machine 3, whose print heads print the corresponding graphic section on the respective wooden stick 2, 14 according to the respective RIP file.

It is also possible that the print files are stored in the printing machine 3. The printing machine 3 then selects the associated print file on the basis of the wooden stick currently to be printed.

In the transport unit, the wooden sticks 2, 14 are fastened in a suitable manner so that they cannot slip during the printing process. If the wooden sticks 2, 14 are marked by the identification features, they do not have to be guided through the printing machine 3 in a specific sequence. Shortly before the printing process, the corresponding RIP file is fed to or selected in the printing machine 3 to print the respective wooden stick 2, 14 with the correct graphic section.

After the printing process, the wooden sticks 2, 14 are guided out of the printing machine 3 and then brought together to form the product 1, resulting in the desired graphic 21.

Figure 13:
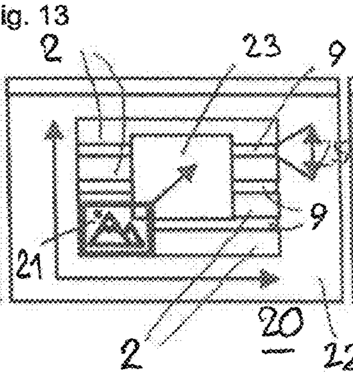
FIG. 13 is a representation corresponding to FIG. 12 of the configurator during the production of the printed image for a product, the wooden sticks of which are spaced apart from one another.

If a final product 1 with a design corresponding to FIG. 3 is to be produced, in which the wooden sticks 2 are arranged next to one another at a distance, this final product 1 to be produced is displayed on the screen 22 with the intermediate space 9 between the wooden sticks 2 with the aid of the configurator 20 (FIG. 13). The width 25 of the gaps 9 is determined. The wooden sticks 2 are positioned relative to each other on the screen 22 in the manner described. The mask 23 is used to determine the size and position of the graphic 21 to be printed.

The software now calculates which portions of the overall graphic 21 must be distributed to the individual wooden sticks 2. The parts of the graphic lying in the gaps 9 are deleted by the software. A RIP file is created for each wooden stick to be printed, which is then used to print the respective wooden stick in the printing machine 3.

The wooden sticks are fed to the printing machine 3 in the manner described. If the wooden sticks do not have any identification features, such as RFID chip, QR code, or end grain 24, the wooden sticks are fed through the printing machine 3 in the order in which they are subsequently assembled to form the final product 1. If the identification features are used for the wooden sticks, an order in which the wooden sticks are fed to the printing machine 3 is not required. At the printing machine 3, the wooden stick to be printed is recognized based on the identification feature immediately before the printing process and the corresponding RIP file is provided. The process then proceeds in the same way as was explained in the previous embodiment.

Figure 14:
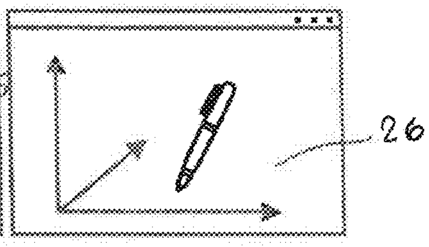
FIG. 14 is a schematic representation of a CAD system for generating the desired printed image on the final product.

In the manufacture of the final product 1 according to FIG. 8, a CAD system 26 is used (FIG. 14). Using the CAD system 26, the wooden construction is created as final product 1 as shown in FIG. 8. In the next step, a desired graphic is placed over the construction and positioned. From this it is easy to determine which areas of the overall graphic are printed on the respective wooden sticks 2, 14. Those areas of the final product 1 which are located between the wooden sticks 2, 14 are deleted during the analysis of the graphic areas. Any suitable CAD program can be used for the CAD system 26.

The wooden sticks 2, 14 are conveyed in succession through the printing machine 3 (FIG. 9) and then joined together in the intended and constructed sequence, for example according to a construction plan, to form the wooden structure. This ensures that the graphics on the final product are readable and visible as desired.

In order for the appropriate graphic section to be applied to the wooden sticks 2, 14, they are either transported one after the other through the printing machine 3 in the assembly sequence as described above or are provided with identification features so that a specific sequence does not have to be observed during the printing process.

Figure 16:
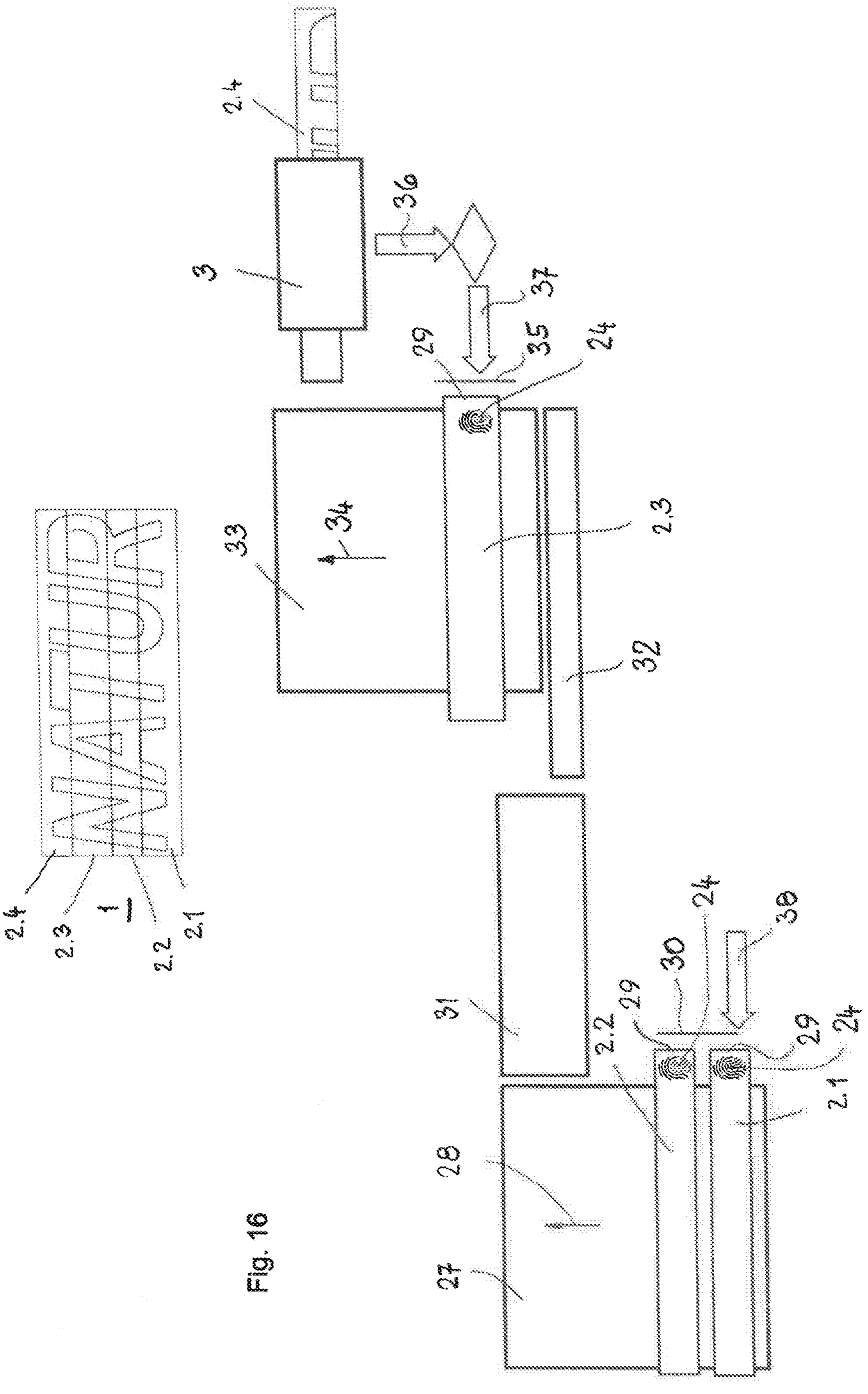
FIGS. 16 and 17 each show a schematic representation of a flowchart for part tracking of the wooden sticks for producing the respective product.

FIG. 16 shows an example of a system with which the wooden sticks are fed to the printing machine 3. The system is intended as an example only. It can have any other suitable structure.

The process sequence is described by way of example for a product 1 which, according to the embodiment according to FIG. 1, has the wooden sticks 2.1, 2.2, 2.3, 2.4 resting against one another with their longitudinal sides.

The system has a transverse conveyor 27, with which the wooden sticks 2.1 to 2.4 are transported transversely to their longitudinal direction in the transport direction 28.

On the transverse conveyor 27, the wooden sticks 2.1 to 2.4 are aligned with one another such that their one end faces 29 are at the same height. This can be achieved by a corresponding aligner 30 that is displaceable transversely to the transport direction 28, which is displaceable against the wooden sticks 2.1 to 2.4 and aligns them at the end face. During transit, the end grain 24 of the wooden sticks 2.1 to 2.4 is detected by a detection system 38, which uniquely identifies them as described.

The wooden sticks 2.1 to 2.4 are then conveyed in their longitudinal direction through a planing machine 31, with which the corresponding side of the wooden sticks 2.1 to 2.4 to be printed is processed in such a way that perfect printing on the wooden sticks is ensured. The planing machine 31 can be, for example, a moulder, with the tools of which the side of the wooden sticks to be printed can be planed smoothly in a known way. With the moulder it is possible to plane all four sides of the wooden stick smooth in one pass. For this purpose, the moulder is equipped in the usual way with right and left, upper and lower spindles, on each of which planing heads are located. Depending on which side of the wooden stick 2.1 to 2.4 is to be printed, one, two, three or four spindles with the planing heads seated thereon are driven in rotation so that the corresponding sides of the wooden stick are processed.

If the wooden sticks are provided with identification features in the manner described, they can also be used to control the processing of the wooden sticks 2.1 to 2.4 in the moulder. For this purpose, the system is equipped with corresponding sensors which detect the identification features and feed them to the moulder 31.

The planing heads sitting on the spindles are designed so that all sides of the wooden sticks can be worked on if necessary. For example, profiled planing heads can be used for the wooden sticks 2 according to FIG. 3 in order to be able to machine the side wall sections 6*a* and the further side wall sections 6*b* which are arranged at an angle to one another.

The planing machine 31 is adjoined by a longitudinal conveyor 32, which is, for example, a conveyor belt on which the wooden sticks 2.1 to 2.4 processed in the planing machine 31 are transported in their longitudinal direction.

The wooden sticks 2.1 to 2.4 are transferred by the longitudinal conveyor 32 to a transverse conveyor 33, with which the wooden sticks are transported perpendicular to their longitudinal direction in the transport direction 34. Advantageously, the pieces of wood 2.1 to 2.4 on the transverse conveyor 33 are aligned in their longitudinal direction, for example, by an aligner 35 that is adjustable transversely to the transport direction 34.

After the transverse transport, the aligned wooden sticks 2.1 to 2.4 are then transported in their longitudinal direction through the printing machine 3, in which the wooden stick is printed in the manner described.

In the illustration according to FIG. 16, the wooden sticks 2.1, 2.2 are still located on the transverse conveyor 27, while the wooden stick 2.3 has already passed the planing machine 31 and is fed by the transverse conveyor 33 to the printing machine 3. The wooden stick 2.4 is currently being printed in the printing machine 3.

In the feed area from the planing machine 31 to the printing machine 3, for example in the region of the transverse conveyor 33, a detection device 37 is provided, which detects the end grain 24 of the respective wooden stick and supplies a corresponding signal (identification information) to the printing machine 3. It can then provide the file belonging to the detected wooden stick in order to print it.

Before the printing process, it is checked whether the wooden stick entering the printing machine 3 and the individual file provided for the printing process belong together. A comparison (diamond symbol) is made between the provided print file (arrow 36) and the recorded wooden stick 2.3 (FIG. 16). In the example case of FIG. 16, the print file and the wooden stick 2, 3 belong together.

Figure 17:
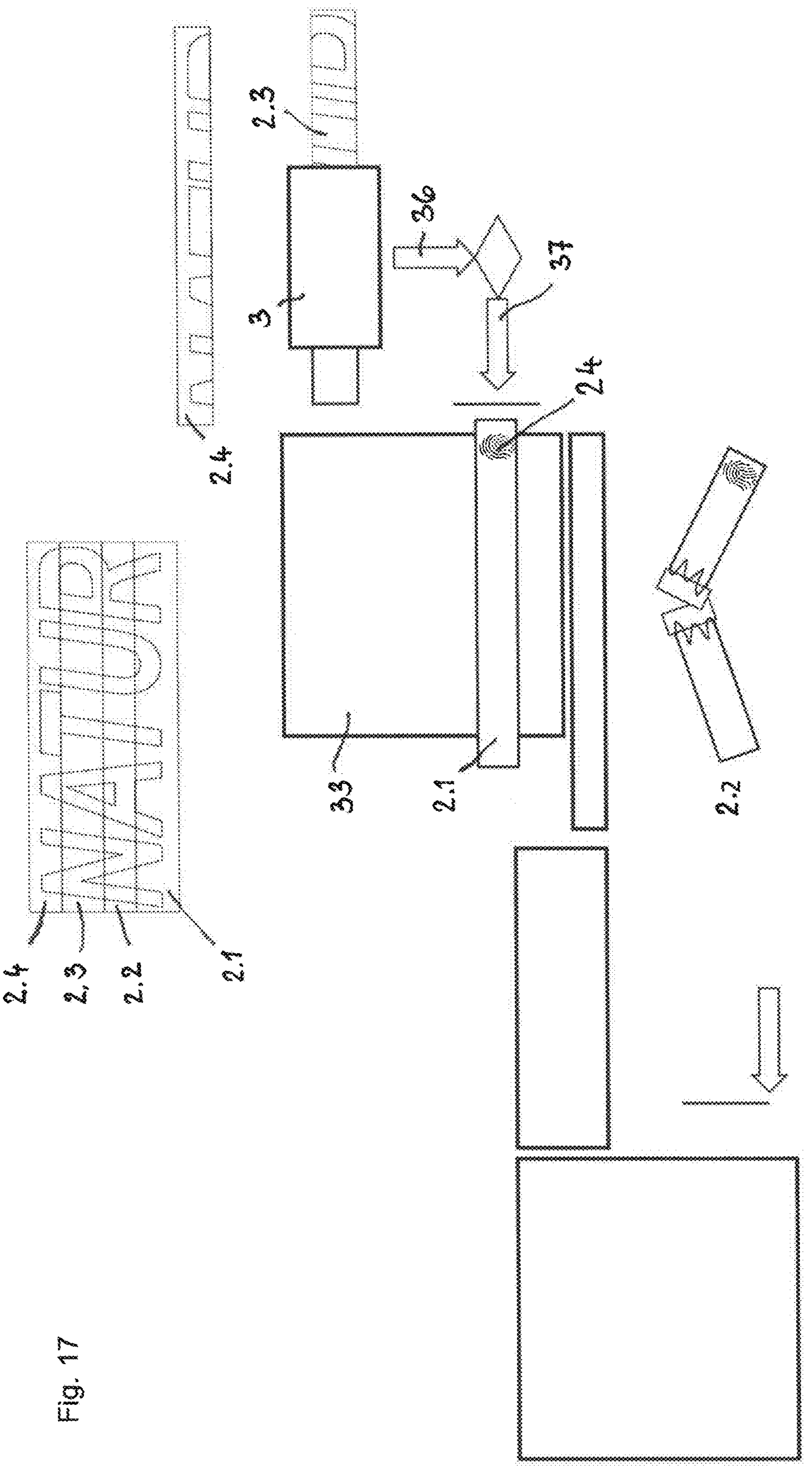

FIG. 17 shows, by way of example, the case where the wooden stick 2.2 is broken. The wooden stick 2.4 has already been printed and has left the printing machine 3, in which the wooden stick 2.3 is currently being printed. Next, the wooden stick 2.2 would have to be printed, but it is broken. Therefore, the next part to be fed by the transverse conveyor 33 is the wooden stick 2.1.

The detection device 37 detects from the end grain 24 that the wooden stick 2.1 is located on the transverse conveyor 33 and sends a corresponding signal to the control system. The comparison between the wooden stick expected by the printing machine (signal 36) and the identified wooden stick 2.1, which is fed in next, shows that they do not fit together and that an intervention in the further process is necessary. For example, the printing machine 3 receives a corresponding signal so that the associated file can be made available for printing the wooden stick 2.1.

In addition, a signal or an indication is provided that the wooden stick 2.2 that was next in line is missing. Thus, the user of the method can feed a new wooden stick 2.2 in the manner described in order to print it.

After all wooden sticks 2.1 to 2.4 have been printed, they can be assembled in the planned manner to form the final product 1.

In the described embodiments, the graphic is not provided on all sides of the wooden stick 2, 14. Depending on the design of the final product 1, it is possible to print all sides of the wooden stick 2, 14 with the printing machine 3. In this case, all sides of the wooden stick 2, 14 to be printed are pretreated in the manner described, for example by priming and, if necessary, sanding.

In all embodiments, RIP files are generated for each wooden stick in the manner described, which are passed on to the printing machine 3, whose print heads print the corresponding graphic section on the wooden stick according to the assigned RIP file. The printed wooden sticks are then put together to create the desired graphic 8 on the final product 1.

If necessary, the individual wooden sticks or the final product as a whole can be further treated, for example by coating them with a layer of clear varnish or something similar.

What is claimed is:

1. A method for applying a graphic to a product formed at least partially from wooden sticks, the method comprising:

providing a plurality of wooden sticks, each of the wooden sticks having an end face and a top side;

dividing the graphic into graphic sections;

assigning one of the graphic sections to each of the wooden sticks;

identifying each of the wooden sticks before it enters a printing machine;

printing the assigned graphic section onto the top side of each identified wooden stick; and assembling the wooden sticks after printing, wherein the graphic sections of the wooden sticks jointly create the graphic on the product (1).

2. The method according to claim 1, wherein providing the plurality of wooden sticks includes providing wooden sticks having different widths and/or thicknesses and/or lengths.

3. The method according to claim 1, wherein providing the plurality of wooden sticks includes providing wooden sticks having different widths and/or thicknesses and/or lengths and having a constant cross section over their length.

4. The method according to claim 1, further comprising priming and/or varnishing the wooden sticks on a side to be printed before the printing.

5. The method according to claim 1, further comprising planing and/or sanding the wooden sticks on a side to be printed before the printing.

6. The method according to claim 1, further comprising recording and storing the graphic in file form in a graphic file.

7. The method according to claim 6, wherein assigning the graphic sections to the wooden sticks includes generating individual files in RIP format assigned to each of the wooden sticks to be printed from the graphic file.

8. The method according to claim 7, further comprising feeding the individual files to the printing machine for the printing.

9. The method according to claim 8, further comprising feeding the wooden sticks to the printing machine in a predetermined sequence.

10. The method according to claim 9, further comprising detecting a deviation from the predetermined sequence by recognizing a mismatch between an expected one of the wooden sticks and the identified wooden stick, and feeding a replacement stick to the printing machine in response to the deviation.

11. The method according to claim 9, further comprising detecting a deviation from the predetermined sequence by recognizing a mismatch between an expected one of the wooden sticks and the identified wooden stick, and switching one of the individual files in RIP format for another one of the individual files in RIP format in response to the deviation.

12. The method according to claim 6, wherein assigning the graphic sections to the wooden sticks includes generating individual files assigned to each of the wooden sticks to be printed from the graphic file.

13. The method according to claim 1, wherein identifying each of the wooden sticks before it enters the printing machine is performed by identifying each of the wooden sticks by a marking.

14. The method according to claim 13, wherein printing the assigned graphic section onto the top side of each identified wooden stick includes selecting an individual file assigned to the identified wooden stick based on the marking, and using the individual file by the printing machine to print the identified wooden stick.

15. The method according to claim 1, wherein identifying each of the wooden sticks before it enters the printing machine includes detecting a grain on an end face of each of the wooden sticks by a detection device as identification in form of an optical fingerprint.

16. The method according to claim 15, further comprising tracking the wooden sticks using the optical fingerprint during transport.

17. The method according to claim 15, wherein detecting the grain on the end face of each the wooden sticks is performed by a camera system.

18. The method according to claim 1, further comprising defining each of the wooden sticks in a configurator and positioning the wooden sticks on a screen relative to one another.

19. A method for applying a graphic to a product formed at least partially from wooden sticks, the method comprising:

defining the wooden sticks with respect to their dimensions, including length and width, in a configurator and positioning the wooden sticks relative to one another on a screen;

dividing the graphic into graphic sections;

printing the graphic sections onto the wooden sticks; and assembling the wooden sticks after printing to form the product, wherein the graphic sections of the wooden sticks jointly create the graphic on the product.

* * * * *